(12) United States Patent
Chaturvedi

(10) Patent No.: US 11,312,551 B2
(45) Date of Patent: Apr. 26, 2022

(54) EASY-TO-TEAR FLEXIBLE PACKAGING SUBSTRATE

(71) Applicant: Ashok Chaturvedi, New Delhi (IN)

(72) Inventor: Ashok Chaturvedi, New Delhi (IN)

(*) Notice: Subject to any disclaimer, the term of this patent is extended or adjusted under 35 U.S.C. 154(b) by 0 days.

(21) Appl. No.: 17/252,624

(22) PCT Filed: Jun. 21, 2019

(86) PCT No.: PCT/IN2019/050466
§ 371 (c)(1),
(2) Date: Dec. 15, 2020

(87) PCT Pub. No.: WO2019/244172
PCT Pub. Date: Dec. 26, 2019

(65) Prior Publication Data
US 2021/0179329 A1    Jun. 17, 2021

(30) Foreign Application Priority Data
Jun. 22, 2018 (IN) .............................. 201811023315

(51) Int. Cl.
*B65D 65/40* (2006.01)
*B32B 3/30* (2006.01)
(Continued)

(52) U.S. Cl.
CPC .............. *B65D 65/406* (2013.01); *B32B 3/30* (2013.01); *B32B 7/12* (2013.01); *B32B 15/08* (2013.01);
(Continued)

(58) Field of Classification Search
CPC ........... B65D 65/406; B32B 3/30; B32B 7/12; B32B 15/08; B32B 27/08; B32B 27/10;
(Continued)

(56) References Cited

U.S. PATENT DOCUMENTS 4,543,279 A     9/1985  Kai
5,874,155 A *   2/1999  Gehrke .................. B32B 27/32
                                              428/134
(Continued)

FOREIGN PATENT DOCUMENTS

WO      2017142730 A1    8/2017

OTHER PUBLICATIONS

International Search Report and Written Opinion dated Oct. 7, 2019 in related International Patent Application No. PCT/IN2019/050466.

(Continued)

*Primary Examiner* — Frank J Vineis
*Assistant Examiner* — Laura B Figg
(74) *Attorney, Agent, or Firm* — Dinsmore & Shohl, LLP

(57) ABSTRACT

The present invention describes easy-to-tear polymeric flexible packaging substrate i.e. polymeric film/laminate. The easy-to-tear flexible packaging film is obtained by providing a plurality of non-through micro-indentations on one or both surface of the film. The micro-indentations are located over the entire or partial surface area of the film. The easy-to-tear packaging laminate of the present invention is obtained by providing a plurality of non-through micro-indentations on at least one surface of at least one layer of the packaging laminate. The micro-indentations are located over the entire or partial surface area of the corresponding surfaces of the layers of the laminate. The micro-indentations may have a depth between 1~70% of the thickness of the polymeric layer. The density of the micro-indentations on a particular surface may be from 10/cm² to 10,000/cm².

16 Claims, 4 Drawing Sheets

(51) Int. Cl.
  *B32B 7/12* (2006.01)
  *B32B 15/08* (2006.01)
  *B32B 27/08* (2006.01)
  *B32B 27/10* (2006.01)
  *B32B 27/30* (2006.01)
  *B32B 27/32* (2006.01)
  *B32B 27/34* (2006.01)
  *B32B 27/36* (2006.01)

(52) U.S. Cl.
  CPC .............. *B32B 27/08* (2013.01); *B32B 27/10* (2013.01); *B32B 27/304* (2013.01); *B32B 27/306* (2013.01); *B32B 27/308* (2013.01); *B32B 27/32* (2013.01); *B32B 27/34* (2013.01); *B32B 27/36* (2013.01); *B32B 27/365* (2013.01); *B32B 2255/10* (2013.01); *B32B 2255/205* (2013.01); *B32B 2255/26* (2013.01); *B32B 2307/31* (2013.01); *B32B 2307/518* (2013.01); *B32B 2307/582* (2013.01); *B32B 2553/00* (2013.01)

(58) Field of Classification Search
  CPC ... B32B 27/304; B32B 27/306; B32B 27/308; B32B 27/32; B32B 27/34; B32B 27/36; B32B 27/365; B32B 2255/10; B32B 2255/205; B32B 2255/26; B32B 2307/31; B32B 2307/518; B32B 2307/582; B32B 2553/00

See application file for complete search history.

(56) References Cited

U.S. PATENT DOCUMENTS

| | | |
|---|---|---|
| 5,878,549 A | 3/1999 | Littmann et al. |
| 2005/0084636 A1* | 4/2005 | Papenfuss ............... B32B 3/04 428/35.7 |
| 2014/0138025 A1 | 5/2014 | Bartusiak et al. |
| 2016/0023430 A1 | 1/2016 | Calkins |

OTHER PUBLICATIONS

International Preliminary Report on Patentability dated Dec. 22, 2020 in related International Patent Application No. PCT/IN2019/050466.

* cited by examiner

EASY-TO-TEAR FLEXIBLE PACKAGING SUBSTRATE

FIELD OF THE INVENTION

This present invention relates to an easy-to-tear polymeric flexible packaging substrate. More particularly, the invention relates to easy-to-tear polymeric film or laminate obtained by surface treatment.

BACKGROUND OF THE INVENTION

Generally, polymeric or thermoplastic flexible packaging materials are difficult to tear because the materials are flexible and are usually comprised of randomly dispersed, long chains of molecules having relatively strong covalent carbon-to-carbon bonds.

One method of making easy to tear is generally to stretch or orient the thermoplastic materials as they are being cast or blown. Stretching lines up the molecular chains in the stretched direction so that tearing occurs in that direction. This method has limited effectiveness because not all polymers can be readily oriented. Also, only a certain amount of molecules can be aligned, and, despite the stretching, tearing may still not be easy and reliable. Orienting also requires special manufacturing efforts and care. Moreover the tearing may be possible in machine direction but difficult in transverse direction. Apart from that the easy tearing by hand is not that much effective. In case of laminated structures where more than one layers of films are present due to packaging requirements, tearing requires even more efforts or some cutting tools etc. to open the package to access the contents.

Another method of tearing open the package is forming a tear line, widely used for single layer films, is to employ a star wheel to form a line of intermittent perforations in the films. Perforations are unsuitable for multilayer laminates for many reasons. One such reason is that perforations in the film allow product-environment exchanges which defeat the purpose of using multilayer films, i.e., to protect packaged product by combining gas barrier properties of one material with moisture barrier properties of another.

Another method of imparting an easy to tear feature to a laminate structure is through the use of laser scoring. Laser scoring, however, requires the use of specialized very expensive equipment, and therefore, leads to increased costs of manufacture.

An alternative to the above methods of producing an easy-to-tear effect is to produce multiple cuts or scores mechanically in designated area of film to create the easy-to-tear effect in particular direction. Again this method is unsuitable for laminate for many reasons. One such reason is that perforations in the film allow product-environment exchanges which defeat a purpose of using multilayer films, i.e., to protect the packaged product by combining gas barrier properties of one material with moisture barrier properties of another U.S. Pat. No. 4,543,279, to Kai, teaches a film with an easy opening feature of a plurality of random cuts or scratches formed along the edges of a film.

As discussed above, the easy to tear flexible polymeric packaging substrate (film/laminate) of the prior arts are not effective i.e. much efforts or cutting tool is required to tear the film/laminate. Therefore there is a need of an improved easy-to-tear flexible polymeric packaging substrate that can easily be torn without much additional efforts or cutting tool, without compromising with the essential features, such as barrier properties.

SUMMARY OF THE INVENTION

This invention describes easy-to-tear polymeric flexible packaging substrate i.e. polymeric film/laminate. The easy-to-tear flexible packaging film is obtained by providing a plurality of non-through micro-indentations on one or both surface of the film. The micro-indentations are located over the entire or partial area of the film. The easy-to-tear packaging laminate of the present invention is obtained by providing a plurality of non-through micro-indentations on at least one surface of at least one layer of the packaging laminate. The micro-indentations are located over the entire or partial area of the corresponding surfaces of the layers of the laminate. These indentations impart an easy-to-tear capability that can be started from any edge of the film/laminate and the barrier properties are also not compromised as these micro-indentations are not pierced through the films/layers of laminate and are embossed only up to pre-defined partial thickness of the film/layers.

The indentations may be disposed over the entire or partial surface area of the film or of the layers of the laminates in a pattern, or alternatively, may be randomly dispersed.

The laminates of the invention may be comprised of a variety of polymers or copolymers that are commonly used in the manufacture of polymeric films. The laminates, with or without an adhesive layer, may comprise single layer films or multilayer films or combination thereof. One or more of the layers in the laminate may be metal foil, metalized/coated layer, paper, paper board or combination thereof along with the polymeric film layers.

BRIEF DESCRIPTION OF THE DRAWINGS

The advantages and features of the present invention shall be better understood with reference to the following detailed description taken in conjunction with the accompanying drawings, wherein like elements are identified with like symbols and in which.

Like reference numerals refer to like parts throughout the description of several views of the drawings.

DETAILED DESCRIPTION OF THE INVENTION

Figure 1:
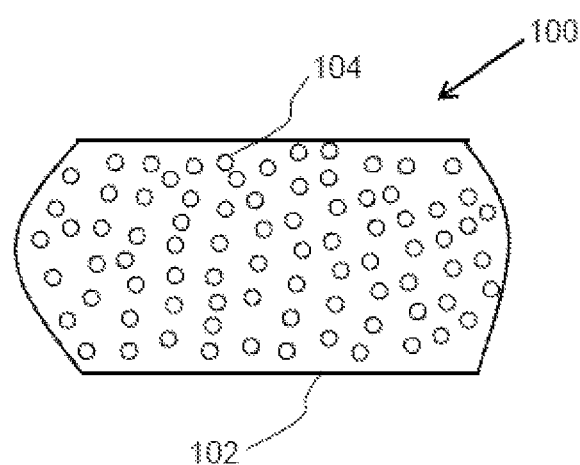
FIG. 1 depicts a top view of a treated surface (102) of an outer layer of a packaging substrate i.e. film/laminate (100) having a plurality of micro-indentations (104), in accordance with an embodiment of the present invention.

For a thorough understanding of the present disclosure, reference is to be made to the following detailed description in connection with the above-mentioned drawings. Although the present disclosure is described in connection with exemplary embodiments, the present disclosure is not intended to be limited to the specific forms set forth herein. It is understood that various omissions and substitutions of equivalents are contemplated as circumstances may suggest or render expedient, but these are intended to cover the application or implementation without departing from the spirit or scope of the present disclosure. Further, it will nevertheless be understood that no limitation in the scope of the disclosure is thereby intended, such alterations and further modifications in the figures and such further applications of the principles of the disclosure as illustrated therein being contemplated as would normally occur to one skilled in the art to which the disclosure relates. Also, it is to be understood that the phraseology and terminology used herein is for the purpose of description and should not be regarded as limiting. Further, reference herein to "one embodiment" or "an embodiment" means that a particular feature, characteristic, or function described in connection with the embodiment is included in at least one embodiment of the disclosure. Furthermore, the appearances of such phrase at various places herein are not necessarily all referring to the same embodiment. The terms "a" and "an" herein do not denote a limitation of quantity, but rather denote the presence of at least one of the referenced item.

The present invention describes an easy-to-tear flexible packaging substrate which can be either polymeric film or laminate thereof. One or both surface of the polymeric film is provided with a plurality of non-through micro-indentations in roll to roll process. However one or both surface of at least one layer of the packaging laminate is provided with a plurality of non-through micro-indentations by mechanical means in roll to roll process. The micro-indentations with specific depth and density could be provided on at least one surface of the film if the substrate is a polymeric film; and on at least one surface of each layer/film in case of a laminate, to be used in the packaging based on the specific easy-to-tear requirement. Further, the polymeric film is single or multilayer polymeric film. The effective easy-to-tear feature refers to ease of opening the packages made using such film/laminate, by hand tearing with little effort without using any cutting tool.

In one embodiment, the easy to tear packaging substrate is a polymeric film having top surface and a bottom surface. At least one surface of the polymeric film is provided with a plurality of non-through micro-indentations of up to a predetermined depth over the entire or partial surface area at a predetermined density. At least one surface of the polymeric film may be metallized or coated with high barrier materials to impart barrier to the easy to tear substrate. It should be appreciated that metallization or coating on the corresponding surface of the film is done after treating the surface to provide the micro-indentations.

In another embodiment, the easy to tear packaging substrate is a laminate which includes an outer polymeric layer having top and bottom surfaces, and at least one inner polymeric layer having top and bottom surfaces. The top surface of the inner layer is laminated with the bottom surface of the outer layer and at least one surface of the outer polymeric layer and at least one surface of the inner polymeric layer is provided with a plurality of non-through micro-indentations of up to a predetermined depth over the entire or partial surface area at a predetermined density.

The outer and inner polymeric layers of the easy to tear packaging laminate are laminated using extrusion lamination or adhesive lamination. The adhesive used in the lamination is, but not limited to, solvent based adhesive, water based adhesive, hot melt adhesive or solvent-less adhesive. In other embodiment, at least one surface of the inner polymeric layer in the easy to tear packaging laminate may be metallized or coated with high barrier material. It should be appreciated that metallization or coating on the corresponding surface of the outer and/or inner film/layer is done after treating the surface to provide the micro-indentations. In further embodiment of the present invention, the easy to tear packaging laminate is a three layer structure having a metal foil layer as a third layer in between the two polymeric layers. The inner layer is laminated to metal foil layer which in turn is laminated to the outer layer. It should be appreciated that only the polymeric layers of the laminate are provided with the micro-indentations on at least one surface. In various embodiment of the present invention, the predetermined depth of the micro-indentations is between 1% and 70% of the thickness of the corresponding polymeric layer, more preferably between 5% and 30% of the thickness of the corresponding polymeric layer, whereas the predetermined density of the micro-indentations is between 10 per $cm^2$ and 10,000 per $cm^2$.

In another embodiment, the easy to tear packaging laminate includes an outer polymeric film layer having top and bottom surfaces laminated with an inner multilayer polymeric film having top and bottom surface. The multilayer film may be a 2, 3, 5, 7, 9 or 11 layer film with a combination of polymeric layer including barrier layer of suitable polymer such as EVOH. The top and/or bottom surfaces of the outer layer and/or inner layer is provided with a plurality of micro-indentations up to a predetermined depth over the entire surface area at a predetermined density according to embodiment of the present invention. However, it is preferred to provide micro-indentations on both surface of each polymeric layer to facilitate easy to tear of the laminate structure.

Further at least one surface of the outer and/or at least one surface of the inner layer may be coated with barrier coating such as PVDC. At least one surface of the any polymeric layer may be coated with special coating to reduce OTR values.

Now hereinafter, various embodiment of the present invention will be described through FIGS. 1-5.

FIG. 1 depicts a top view of a treated surface (102) of an outer layer of a packaging substrate i.e. film/laminate (100) having a plurality of micro-indentations (104), in accordance with an embodiment of the present invention. The treated surface herein refers to a surface having a plurality of non-through micro-indentations of particular specification provided by embossing means in roll to roll process. The depth of the micro-indentations is between 1 to 70% of the film layer thickness, preferably 5 to 30% of the film layer thickness. The predetermined density of the micro-indentations is between 10 per $cm^2$ and 10,000 per $cm^2$. Various layers of the packaging substrate (100) may include polymers commonly used in the art of making films and laminates for packaging. The packaging film/laminate web (100) may comprise plurality of polymeric single layer films or multi-layer films or a combination thereof. The laminate may also include, but not limited to, paper, paper board or metal foil or combination thereof along with polymeric layers.

It should be contemplated that in case of both side surfaces of a film/individual layer of a laminate are provided with the micro-indentations (104), the sum of depth of the micro-indentations from both surface does not exceed the thickness of the polymeric film/layer provided that a substantial thickness of the film/layer is left non-pierced even when the two opposite micro-indentations fall opposite to each other.

Examples of single or multilayer polymeric films may include Polyethylene (PE), Biaxially-Oriented Polypropylene (BOPP) film, Polyvinyl Chloride (PVC) film, Poly Carbonate (PC), Cast Polyproylene (CPP) film, Polytetrafluoroethylene, Biaxially-Oriented Polyethylene Terephthalate (BOPET), Polyamide (PA), Acrylic (Polymethyl methacrylate) (PMMA), and Ethylene Vinyl Acetate (EVA), biodegradable polymer or any other suitable polymer or combination thereof. The packaging laminate may include inner and outer layers of one of the above mentioned polymeric film mentioned or combination thereof. In a preferred embodiment, the outer layer in packaging laminate (100) is a Bi-axially oriented polypropylene ("BOPP") or a Bi-axially oriented polyethylene terephthalate ("BOPET") laminated with single layer or multilayer Polyethylene (PE) or other heat sealable polymeric material as inner layer.

As depicted in FIG. 1, the surface (102) of the packaging substrate (100) may include a plurality of non-through micro-indentations (104) of a predetermined depth and in a predetermined density that are located over the entire or partial surface area (102) to create the easy-to-tear feature of the invention. Although FIG. 1 depicts only a single treated surface (102) having the micro-indentations (104), single or both surfaces of the polymeric film or of each polymeric layer in case of laminate may be treated and provided with the micro-indentations (104) according to various embodiments of the present invention depending on thickness of the laminate and ease of tearing desired.

The polymeric film (100) may have thicknesses in the range, for example from 5 to 300 microns. The general packaging laminate may have a thickness preferably in the range of 20 to 200 microns.

The packaging substrate (100) may be printed on untreated surface or treated surfaces. Similarly metallization or barrier coating can be done before or after treatment of surface(s) however it is preferred to perform metallization or barrier coating (e.g., PVdC) after treatment to ensure integrity of metallized surface. Printing can be done by any of the methods known in the art of making flexible packaging. For example, the roll to roll printing can be done by letter press, offset, flexographic, rotogravure, digital, laser or screen printing method.

Figure 2A:
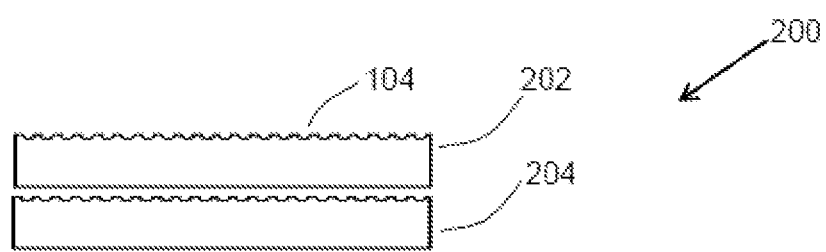
FIGS. 2A & 2B depict a packaging laminate (200) having two layers (202, 204), in accordance with an embodiment of the present invention.
Figure 2B:
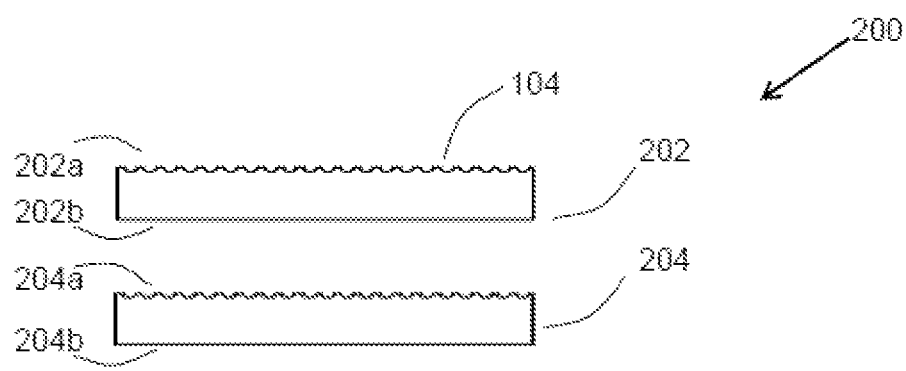

FIGS. 2A & 2B, show an easy tear laminate according to the embodiment of present invention having an outer polymeric layer (202) and the inner polymeric layer (204) laminated together as shown. The bottom surface (202b) of the outer layer (202) and the top surface (204a) of the inner layer (204) are laminated using the suitable lamination process. The layers (202, 204) of the packaging laminate (200) may be laminated using extrusion lamination or adhesive lamination process or other suitable lamination processes. As extrusion or adhesive lamination processes are established processes and also well known to a person skilled in the art hence details of these processes are skipped for brevity. Each layer essentially being a standalone polymeric film, at least one surface of these layers may be provided with non-through micro-indentations before lamination, to make it easy to tear.

FIG. 2B depicts exploded view of laminate of FIG. 2A having treated surfaces (202a, 204a) of the respective layers in a packaging laminate (200) having two layers (202, 204) in accordance with an embodiment of the present invention. As shown, the top surface (202a) of the outer layer (202) and the top surface (204a) of the inner layer (204) are treated mechanically to impart easy to tear feature in the corresponding laminate so as to make the laminate (200) as described in conjunction with FIG. 2A. It should be contemplated that the packaging laminate (200) of the present invention may include multiple layers of suitable polymeric films and at least one surface of each layer may be treated mechanically to impart effective easy-to-tear feature in the laminate. Surface printing or reverse printing may be performed on the outer layer (202) before lamination. Metallization can also be done on either surface (202b) or (204a) or both.

In alternate embodiment, the bottom surface (202b) of the outer layer (202) and the bottom surface (204b) of the inner laminate (204) may be provided with micro-indentations without deviating from the scope of the present invention. In further alternate embodiment, the bottom surface (202b) of the outer layer (202) and the top surface (204a) of the inner laminate (204) may be provided with micro-indentations without deviating from the scope of the present invention.

Figure 3:
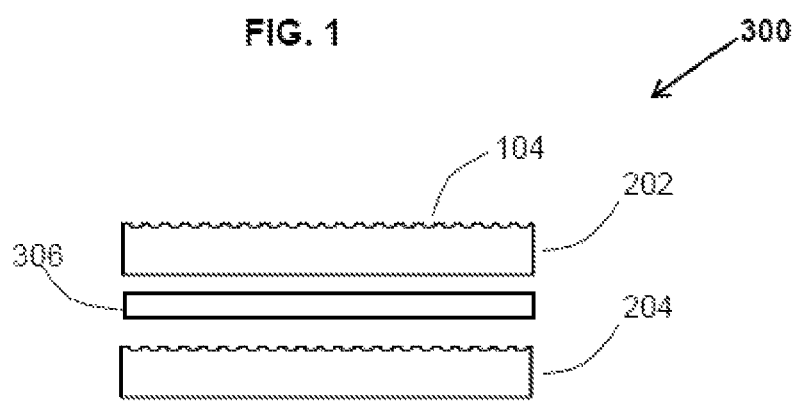
FIG. 3 depicts a laminated packaging laminate (300) having three layers (202, 306, 204), in accordance with an embodiment of the present invention.

FIG. 3 depicts laminated packaging laminate (300) having three layers (202, 306, 204), in accordance with an embodiment of the present invention. The packaging laminate (300) includes an outer polymeric layer (202), an inner polymeric layer (204) and a middle layer (306). The layer (306) may be paper, or paper board, synthetic fibrous substrates. If the middle layer (306) is required to enhance the barrier properties in the packaging laminate (300) essential for the products to be packaged, the layer (306) may be a foil of metal such as, but not limited to, Aluminium, Copper, Silver, any other metal or metal alloy. Optionally layer (306) may be a polymeric layer without or with vacuum metallization using one of or combination of Aluminium, Aluminium Oxide, Zinc Sulphide, Silicon Oxide, Silver, Gold, Copper, Chrome, Silicon Monoxide, Silicon Dioxide, Magnesium Fluoride, Titanium Dioxide, Tin Tungsten Oxide and Indium Tin Oxide or any other suitable metal. It should be appreciated that the micro-indentations, as discussed above, are provided on the polymeric layers (202, 204) and not on the metal foils or paper, or paper board, synthetic fibrous substrates. Surface printing or reverse printing may be performed as described above with reference to FIGS. 2A & 2B.

In alternate embodiment, the bottom surface (202b) of the outer layer (202) and the bottom surface (204b) of the inner laminate (204) may be provided with micro-indentations without deviating from the scope of the present invention. In further alternate embodiment, the bottom surface (202b) of the outer layer (202) and the top surface (204a) of the inner laminate (204) may be provided with micro-indentations without deviating from the scope of the present invention.

Figure 4A:
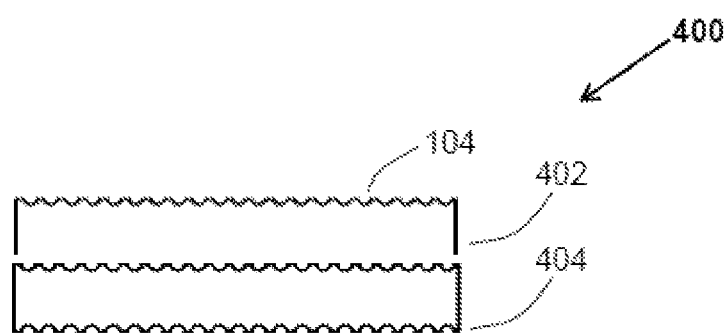
FIGS. 4A & 4B illustrate a two-layer structure of an easy to tear packaging laminate (400), in accordance with another embodiment of the present invention.
Figure 4B:
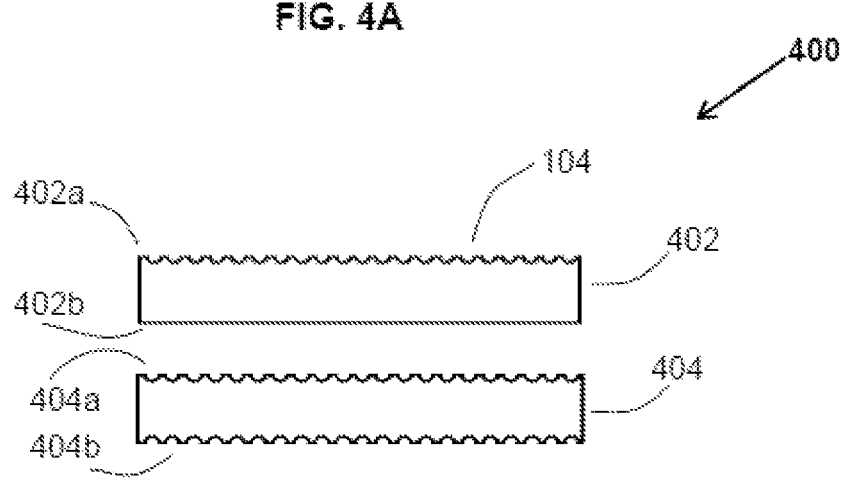

FIGS. 4A & 4B illustrate a two-layer structure of an easy to tear laminate (400), in accordance with another embodiment of the present invention. As shown, the packaging laminate (400) includes an outer layer (402) having top surface (402a) and bottom surface (402b), and an inner layer (404) having top surface (404a) and bottom surface (404b). The top surface (402a) of the outer layer (402) and both surfaces (404a, 404b) of the inner layer (404) are provided with the micro-indentations to impart the easy-to-tear feature in the laminate (400). Alternatively, both surfaces of the outer layer (402) and one surface of inner layer (404) may be treated. The layers (402, 404) of the packaging laminate (400) may be laminated using extrusion lamination or adhesive lamination or any other suitable method known in the art. Surface printing or reverse printing may be performed on the outer layer (402) before lamination. It should be appreciated that layer surfaces (402b) and/or surface (404a) may be metallized which offers barrier properties.

In alternate embodiment, both surfaces (402a, 402b) of the outer layer (402) and the top surface (404a) of the inner laminate (404) may be provided with micro-indentations without deviating from the scope of the present invention.

Figure 5A:
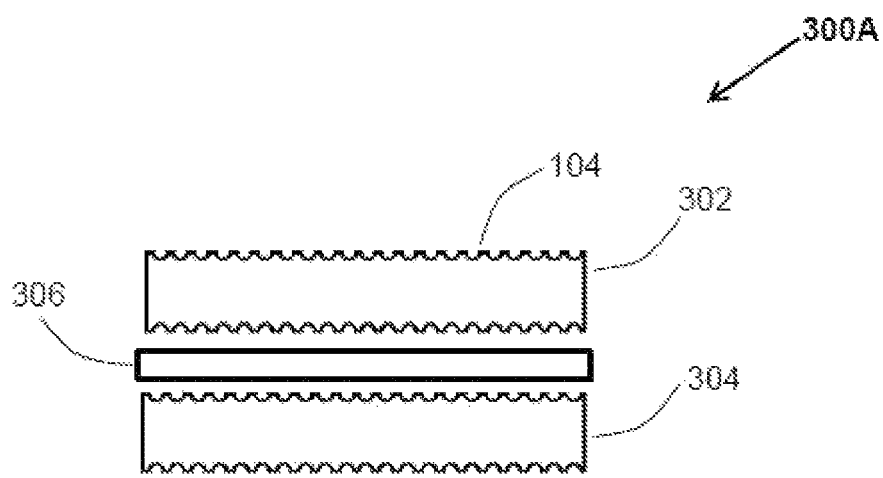
FIG. 5A depicts another alternate of packaging laminate (300) described in FIG. 3 as packaging laminate (300A), in accordance with an embodiment of the present invention.

FIG. 5A depicts another alternate of laminate (300) described in FIG. 3 as packaging laminate (300A) wherein both surfaces of the outer layer (302) and the inner layer (304) are provided with the micro-indentations (104).

Figure 5B:
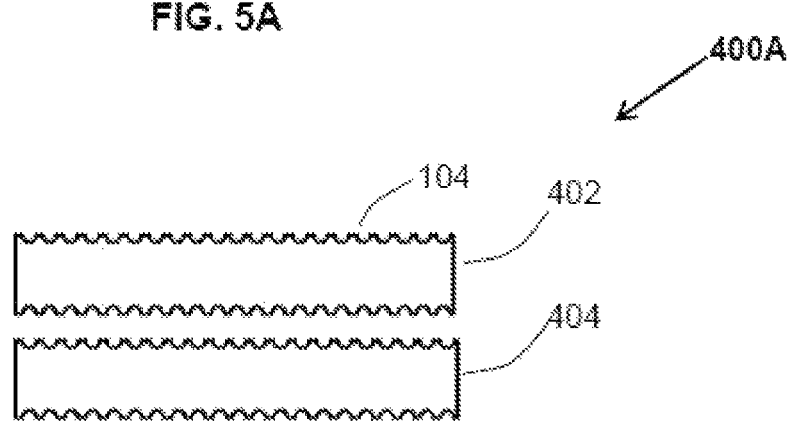
FIG. 5B depicts another alternate of packaging laminate (400) described in FIGS. 4A & 4B as packaging laminate (400A), in accordance with anther embodiment of the present invention.

FIG. 5B depicts another alternate of laminate (400) described in FIGS. 4A & 4B as packaging laminate (400A) wherein both surfaces of the outer layer (402) and the inner layer (404) are provided with the micro-indentations (104).

The laminate may also be provided with images, barcodes, optical patterns, latent images, Fresnel lenses, holograms, sterling lenses and hot or cold foil stamping for desired information, security, anti-counterfeiting or aesthetics purposes. The adhesive lamination may be carried out using hot melt adhesive, water-based adhesive, solvent less adhesive, UV curable adhesive, E-beam curable adhesive or any other method known in the art.

The present invention has advantages over the prior art offer easy and smooth tearing in any direction that does not require tear strips or notches in the sachets or pouches made using such laminate, which may lead to problems during opening by tearing by the user.

These examples are neither intended to cover the only structures that may be made, nor are intended to limit the terms of the invention.

I claim:

1. An easy to tear packaging substrate, comprising:
    (a) an outer layer having a top surface and a bottom surface opposite the top surface; and
    (b) an inner layer laminated with the outer layer and having a top surface and a bottom surface opposite the top surface, the top surface of the inner layer facing the bottom surface of the outer layer,
    wherein:
    at least one surface of the outer layer comprises a plurality of non-through micro-indentations having depths of from 1% to 70% of the thickness of the outer layer over the entire surface area of the at least one surface of the outer layer with a density of from 10 micro-indentations per square centimeter of the at least one surface of the outer layer to 10,000 micro-indentations per square centimeter of the at least one surface of the outer layer, provided a sum of the depths of the non-through micro-indentations in the top surface of the outer layer and the depths of the non-through micro-indentations in the bottom surface of the outer layer is less than the thickness of the outer layer;
    at least one surface of the inner layer comprises a plurality of non-through micro-indentations having depths of from 1% to 70% of the thickness of the inner layer over the entire surface area of the at least one surface of the inner layer with a density of from 10 micro-indentations per square centimeter of the at least one surface of the inner layer to 10,000 micro-indentations per square centimeter of the at least one surface of the inner layer, provided a sum of the depths of the non-through micro-indentations in the top surface of the inner layer and the depths of the non-through micro-indentations in the bottom surface of the inner layer is less than the thickness of the inner layer; and
    the outer layer and the inner layer do not include micro-indentations pierced through the respective layers.

2. The easy to tear packaging substrate according to claim 1, wherein the outer layer and the inner layer are single-layer polymeric films or multilayer polymeric films.

3. The easy to tear packaging substrate according to claim 1, wherein the top surface of the inner layer is laminated with the bottom surface of the outer layer using extrusion lamination or adhesive lamination.

4. The easy to tear packaging substrate according to claim 1, wherein the outer layer is a polymer film selected from BOPET, BOPP, PE, PVC, PC, CPP, PA, PMMA, or EVA.

5. The easy to tear packaging substrate according to claim 1, wherein the inner layer is a film of a heat sealable material.

6. The easy to tear packaging substrate according to claim 1, wherein at least one surface of at least one layer is metallized.

7. The easy to tear packaging substrate according to claim 1 further comprising at least one middle layer between the outer layer and the inner layer.

8. The easy to tear packaging substrate according to claim 7, wherein the middle layer comprises a metal foil, paper, paper board, polymeric barrier material, or a combination thereof.

9. The easy to tear packaging substrate according to claim 1, further comprising a polymeric barrier coating on at least one surface of at least one layer.

10. The easy to tear packaging substrate according to claim 1, wherein the non-through micro-indentations of the at least one surface of the outer layer have depths from 5% to 30% of the thickness of the outer layer; and wherein the non-through micro-indentations of the at least one surface of the inner layer have depths from 5% and 30% of the thickness of the inner layer.

11. An easy to tear packaging substrate comprising a polymeric film having a top surface and a bottom surface wherein the top surface, the bottom surface, or both, comprises a plurality of non-through micro-indentations having depths from 1% to 70% of the thickness of the polymeric film over the entire surface area of the at least one surface in a density from 10 micro-indentations per square centimeter of the surface to 10,000 micro-indentations per square centimeter of the surface, provided a sum of the depths of the non-through micro-indentations on the top surface of the polymeric film and the depths of the non-through micro-indentations on the bottom surface of the polymeric film is less than the thickness of the polymeric film, wherein the polymeric film does not include micro-indentations pierced through the polymeric film.

12. The easy to tear packaging substrate according to claim 11, wherein the polymeric film is a single-layer or multilayer polymeric film.

13. The easy to tear packaging substrate according to claim 11, wherein the polymeric film is selected from the group consisting of BOPET, BOPP, PE, PVC, PC, CPP, PA, PMMA, and EVA.

14. The easy to tear packaging substrate according to claim 11, wherein at least one surface of the polymeric film is metallized.

15. The easy to tear packaging substrate according to claim 11, further comprising a polymeric barrier coating on at least one surface of the polymeric film.

16. The easy to tear packaging substrate according to claim 11, wherein the non-through micro-indentations have depths from 5% to 30% of the thickness of the polymeric film.

\* \* \* \* \*